Figure 1:
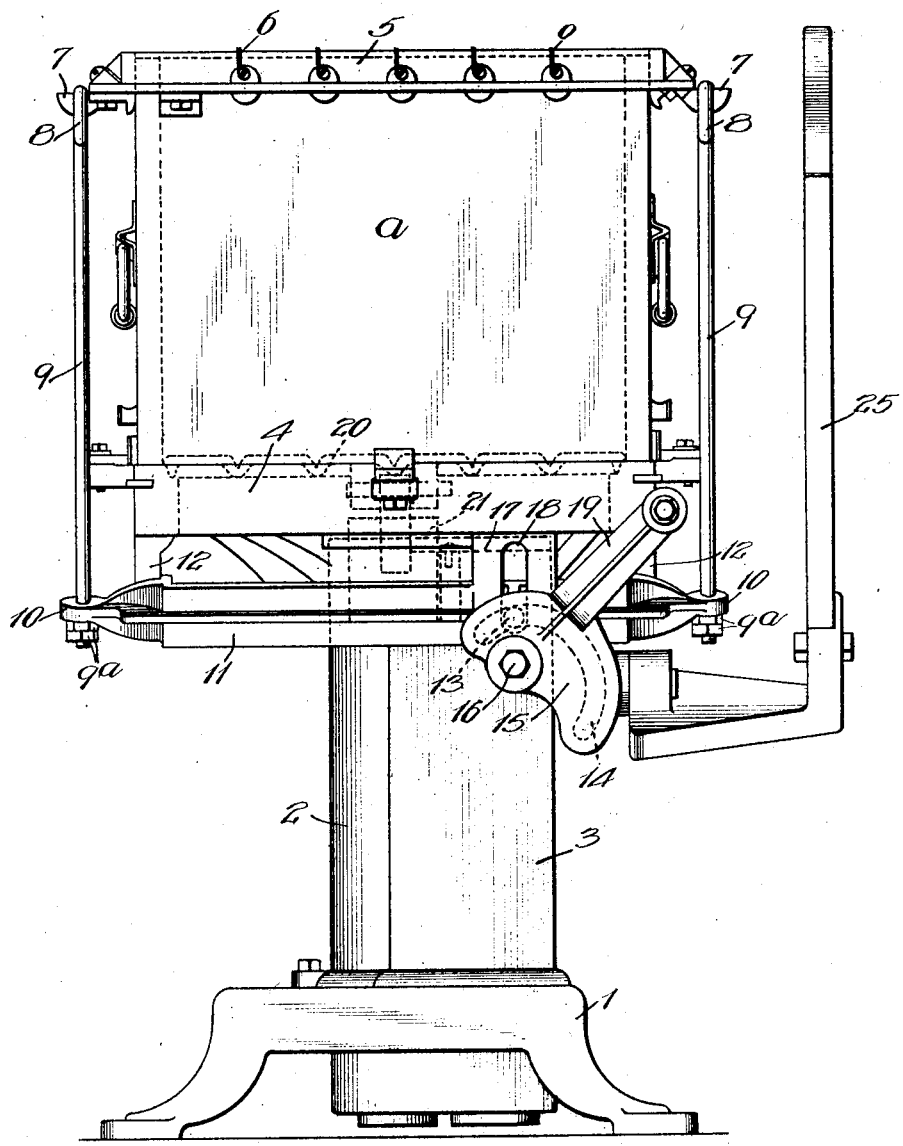

W. E. PENN.
BUTTER CUTTER.
APPLICATION FILED OCT. 11, 1918.

1,382,540.

Patented June 21, 1921.
2 SHEETS—SHEET 1.

Witnesses:
W. P. Kilroy
Harry R. L. White

Inventor:
William E. Penn
By Miller, Chisdall & Parker
Attys.

W. E. PENN.
BUTTER CUTTER.
APPLICATION FILED OCT. 11, 1918.
1,382,540.
Patented June 21, 1921.
2 SHEETS—SHEET 2.
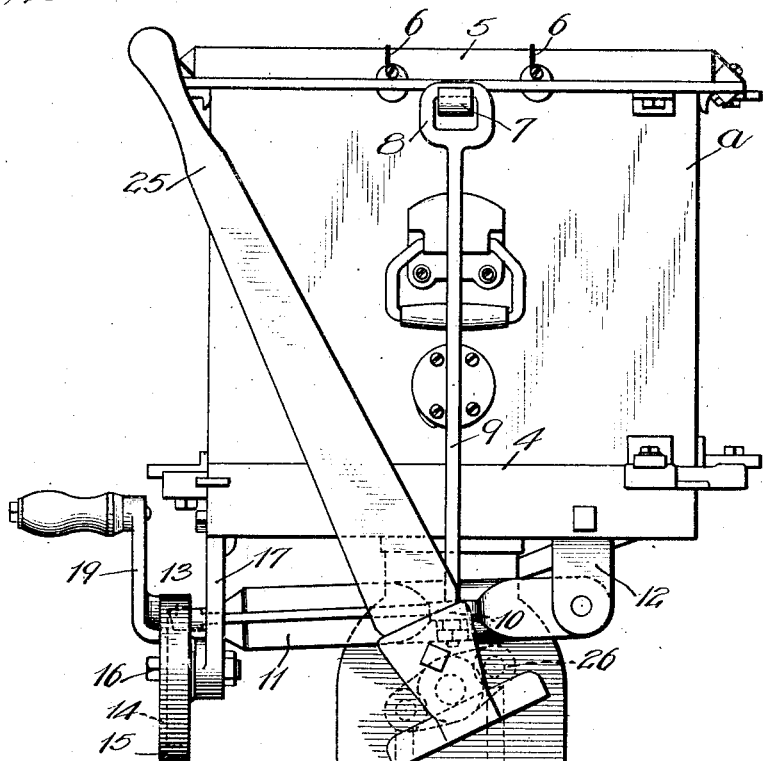
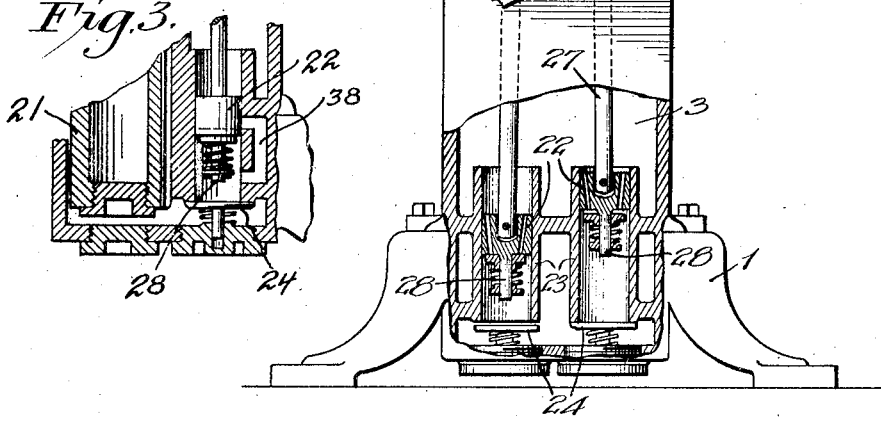
Witnesses
W. P. Kilroy
Harry P. White
Inventor:
William E. Penn
By Miller, Chindahl & Parker
Attys.

UNITED STATES PATENT OFFICE.

WILLIAM E. PENN, OF WATERTOWN, WISCONSIN, ASSIGNOR TO THE CREAMERY PACKAGE MANUFACTURING COMPANY, OF CHICAGO, ILLINOIS, A CORPORATION OF ILLINOIS.

BUTTER-CUTTER.

1,382,540.  Specification of Letters Patent.  Patented June 21, 1921.

Original application filed June 12, 1914, Serial No. 844,618. Divided and this application filed October 11, 1918. Serial No. 257,694.

*To all whom it may concern:*

Be it known that I, WILLIAM E. PENN, a citizen of the United States, residing at Watertown, in the county of Jefferson and State of Wisconsin, have invented certain new and useful Improvements in Butter-Cutters, of which the following is a specification.

This invention relates to apparatus for cutting bulk butter into blocks of desired size, as, for example, one-pound prints, and the primary object thereof is to provide, in combination with means for supporting butter to be cut into prints, improved means for raising and lowering the movable element of the apparatus, as, for example, the platen upon which the butter mass rests.

Another object is to provide convenient means for securing and releasing the frame that carries the cutting wires.

In the accompanying drawings, Figure 1 is a front elevation of a butter cutter embodying the features of my invention. Fig. 2 is a side view of the machine with parts in section. Fig. 3 is a fragmentary section through one of the cylinders in a plane at right angles to the sectional showing in Fig. 2.

The apparatus is particularly intended for use in creameries and other places where large quantities of butter are to be cut into prints. In practice, the butter, after it has been worked, is packed in rectangular boxes *a* provided with removable bottoms. After being filled, the boxes are placed in the refrigerator in order to harden the butter.

The embodiment herein shown of my invention comprises a base 1 of any suitable form, said base supporting a cylinder 2 and an oil reservoir 3. Suitably supported above and carried by the cylinder 2 and the reservoir 3 is a rectangular frame 4 adapted to support a box *a*, the bottom of the box being removed before the box is placed upon the frame 4. 5 is a rectangular frame adapted to be supported upon the open upper side of the box *a*, said frame carrying the cutting wires 6. The frame 5 is provided at opposite ends with hooks 7 adapted to be engaged by eyes 8 on the upper ends of rods 9. The lower ends of the rods 9 pass freely through perforated lugs 10 formed upon a frame 11, said frame being pivotally connected to lugs 12 on the frame 4. Nuts $9^a$ are turned upon the rods 9 below the lugs 10. On the pivoted frame 11 is a stud 13 that lies within the groove 14 of a cam 15, said cam being pivoted at 16 to a bracket 17 secured to the frame 4. The stud 13 projects through a guide-slot 18 in the bracket 17. Fixed to the cam 15 is a crank 19. It will be seen that when the cam 15 is in the position shown in the drawings, the frame 5 is securely held in place upon the upper side of the box *a*, and that when the cam 15 is swung to the left (as viewed in Fig. 1), the frame 11 is raised so that the eyes 8 may be disengaged from the hooks 7, thus permitting of the removal of the cutter frame 5.

The butter mass within the box rests upon a platen 20, and a hydraulic jack is preferably employed to raise and lower the platen within the box. Such jack may be of any preferred construction, as, for example, that illustrated and described in my copending application Serial No. 844,618, filed June 12, 1914, of which this application is a division. Herein I have deemed it unnecessary to illustrate and describe a hydraulic jack in detail, and have shown merely a piston or plunger 21 mounted within the cylinder 2 and arranged to be actuated through the medium of two valved pistons 22 operable in cylinders 23 to force oil from the reservoir 3 into the cylinder 2, communication between the reservoir and cylinder being further controlled by suitable valves 24 as adapted to be actuated by the pistons 22. A hand lever 25 is arranged to actuate the pistons 22 through the medium of a pivoted lever 26 and connecting rods 27.

In use, a box *a* filled with butter is placed upon the frame 4, the cutter frame 5 being mounted upon the box *a* and said cutter frame being locked in place by means of the rods 9 and the cam 15. The hand lever 25 is then oscillated to actuate the pistons 22 whereby to cause the plunger 21 to rise, and the movement is continued until the block of butter in the box *a* has been raised to the desired extent, the wires 6 serving to cut the block vertically during such upward movement of the butter. When the butter has been raised to the desired point the operator takes a cutter frame (not shown) containing a single cutting wire and draws said frame across the top of the frame 5, thereby slicing off that portion of the block of butter which was cut by the wires 6. The prints thereby formed are removed and the butter mass again raised through operation of the hand lever 25. After the entire mass of butter has been cut into prints the platen 20 is lowered into its original position. For this purpose the pistons 22 are each provided with a stud 28 which, when the lever 25 is swung out of its normal range of movement to an extreme position, engages with the corresponding valve 24 to unseat it. In this position of the piston both ends of the by-pass 38 are left open so that oil may flow back through the valve 24 and by-pass 38 permitting the piston 21 to descend. Thus it will be apparent that the hydraulic jack constitutes a very effective means for actuating the butter platen, for the reason that it may be controlled solely through the manipulation of a single hand lever. Moreover, in the operation of slicing off from the mass of butter within the box, the portion which has been cut by the wires 6, the hydraulic jack serves to stationarily support the platen in the desired position without the aid of any means especially designed to hold the platen against downward movement.

I claim as my invention:

1. In a butter-cutter, in combination, a support for a butter box, a cutter frame adapted to rest upon the top of the box, a frame pivoted to said support, rods arranged to connect opposite sides of the cutter frame to opposite sides of said pivoted frame, and means for moving said pivoted frame to exert traction upon the rods.

2. In a butter-cutter, in combination, a support for a butter box, a cutter frame adapted to rest upon the top of the box, a frame pivoted to said support, rods arranged to connect opposite sides of the cutter frame to opposite sides of said pivoted frame, said rods being detachably connected to the cutter frame and slidably connected to the pivoted frame, and means for moving said pivoted frame to exert traction upon the rods.

3. In a butter-cutter, a frame upon which the lower end of a box may be placed, a cutter frame adapted to fit upon the upper end of the box, an element pivotally supported below the first mentioned frame, a plurality of rods engaged by said element and adapted to engage the cutter frame, and means for pivotally moving said element, whereby said cutter frame is securely held in position.

4. In a butter-cutter, a frame upon which the lower end of a box may be placed, a cutter frame adapted to fit upon the upper end of the box, an element movably supported below the first mentioned frame, a plurality of rods engaged by said element and adapted to engage the cutter frame, and a cam for moving said element to exert traction upon the rods, whereby said cutter frame is securely held in position.

5. In a butter-cutter, in combination, a support for a butter box, a cutter frame adapted to rest upon the top of the box, a member movably connected to said support, the ends of said members being perforated, rods detachably connected to opposite sides of the cutter frame and slidable through said perforations, projections on said rods below said member, and means for moving said member to exert traction upon the rods.

6. In a butter-cutter having a movable platen, means for raising and lowering said platen comprising, in combination, a single manipulative control element, means whereby actuation of said element through a predetermined displacement in either direction will raise said platen, means normally operative to prevent lowering said platen and means whereby displacement of said element beyond the normal displacement in either direction will release said preventing means, said raising and lowering means operating by liquid displacement whereby the lowering of said platen is strongly damped.

7. In a butter-cutter having a movable platen, means for raising and lowering said platen comprising, in combination, a single manipulative operating and controlling element adapted to receive power for raising said platen and adapted to actuate controlling means for allowing said platen to move downwardly with a strongly damped motion.

8. In a butter-cutter having a movable platen, means for raising and lowering said platen comprising, in combination, a manually actuated transmission having a locking action without backlash for raising said platen, and manually controlled means for allowing said platen to move downwardly with a strongly damped motion.

9. In a butter-cutter having a movable platen, means for raising and lowering said platen comprising, in combination, a manually actuated transmission having a locking action without backlash for raising said platen, manually controlled means for allowing said platen to move downwardly with a strongly damped motion, and a single manipulative element receiving power for the operation of said raising means and controlling said lowering means.

10. In a butter-cutter having a movable platen, means for raising and lowering said platen comprising, in combination, a manually actuated transmission having a locking action without backlash for raising said platen, manually controlled means for allowing said platen to move downwardly with a strongly damped motion, and a single manipulative element receiving power for the operation of said raising means and controlling said lowering means, said raising means and said lowering means having certain elements in common.

11. In a butter cutter having a movable platen, manual means for raising said platen, manually controlled means for releasing said platen to allow it to descend, and means beyond the control of the operator for damping the descent to limit the speed of the same.

In testimony whereof, I have hereunto set my hand.

WILLIAM E. PENN.